United States Patent [19]

Anderson

[11] 4,281,470

[45] Aug. 4, 1981

[54] HOOK HOLDER

[76] Inventor: David W. Anderson, 7 Brentwick St., West Chermside, Queensland, 4032, Australia

[21] Appl. No.: 81,527

[22] Filed: Oct. 3, 1979

[30] Foreign Application Priority Data

Oct. 4, 1978 [AU] Australia .............................. PD6213

[51] Int. Cl.³ .............................................. A01K 97/06
[52] U.S. Cl. .................................. 43/57.5 R; 224/920
[58] Field of Search ....................... 43/57.5 R, 57.5 A; 206/315; 224/920

[56] References Cited

U.S. PATENT DOCUMENTS

| 578,458 | 3/1897 | Knieriemen | 43/57.5 R |
|---|---|---|---|
| 1,999,779 | 4/1935 | Perrine | 43/57.5 R |
| 2,638,699 | 5/1953 | Seeburg | 43/57.5 R |
| 2,670,563 | 3/1954 | Anderson | 43/57.5 R |
| 2,826,856 | 3/1958 | Marion | 43/57.5 R |
| 3,071,885 | 1/1963 | MacKay | 43/57.5 R |
| 3,680,750 | 8/1972 | Franco | 224/920 X |

Primary Examiner—Nicholas P. Godici

[57] ABSTRACT

A body having a plurality of penetrable faces for insertion of one or more series of ganged hooks, a locator for the swivel of each of the ganged hooks remote from said faces, and a guide for the trace of the hooks intermediate thereof.

8 Claims, 5 Drawing Figures

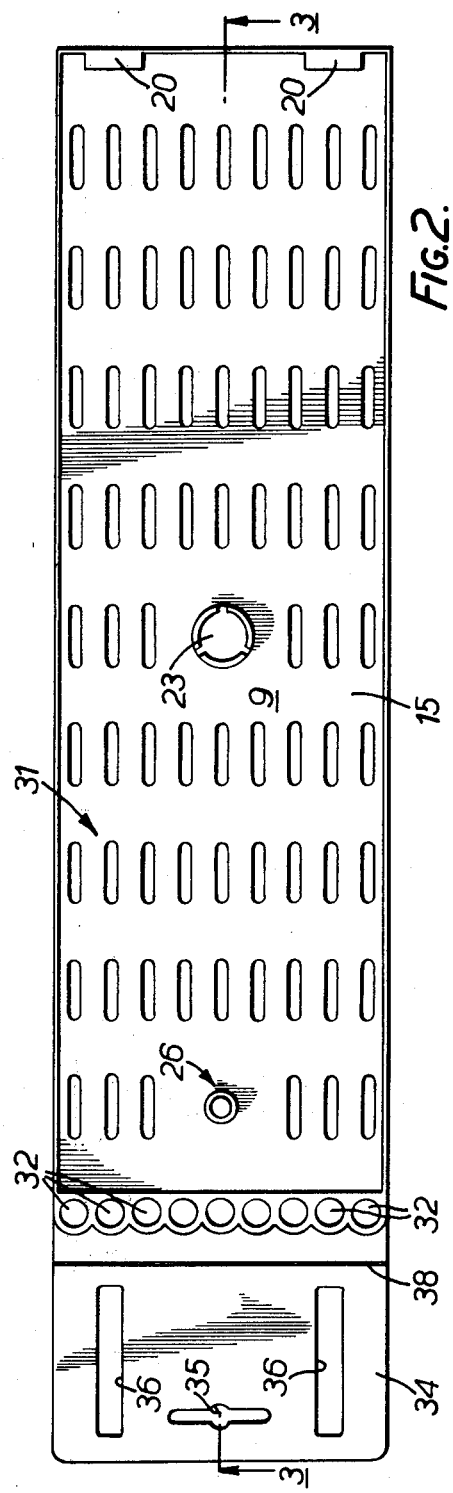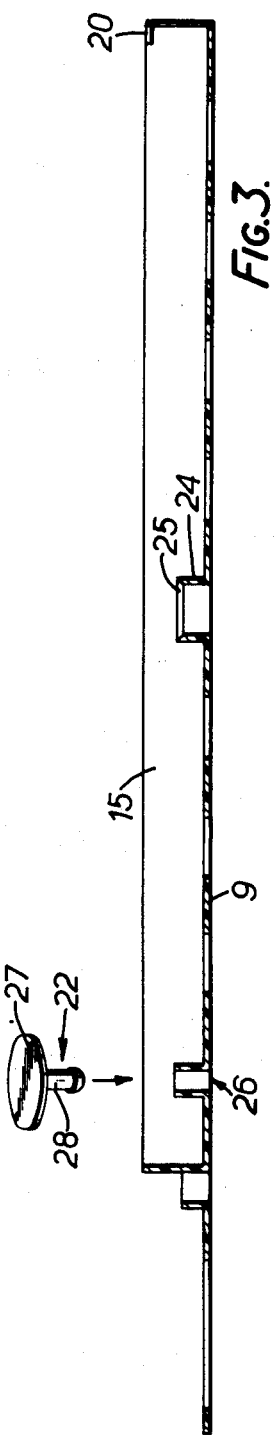

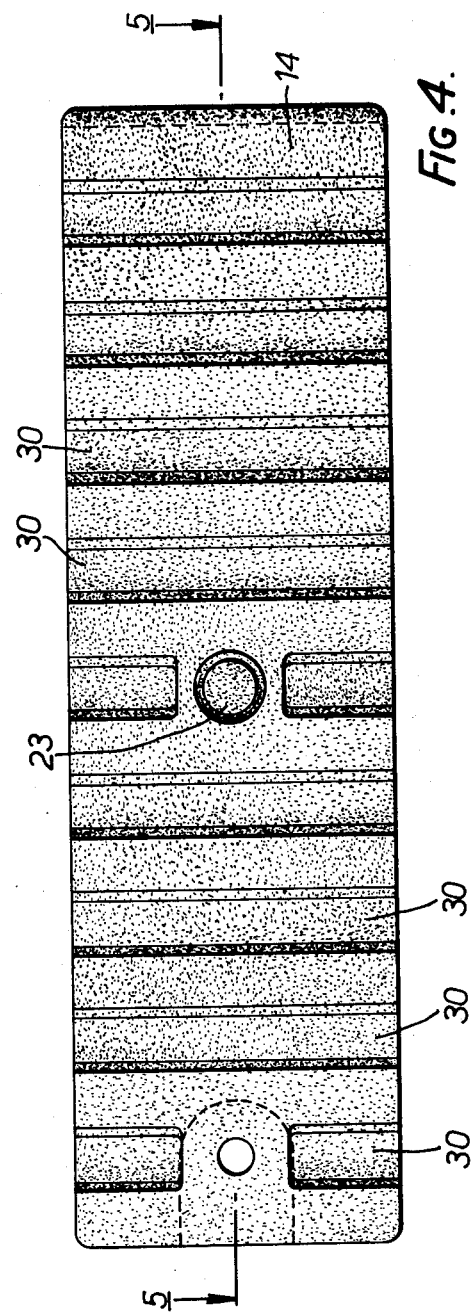
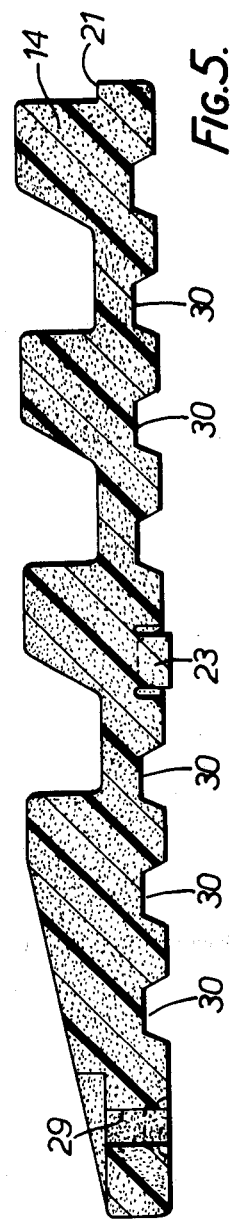

HOOK HOLDER

This invention relates to a holder for fishing rigs.

Anglers often include in their kit an assortment of ready made fishing rigs so that they may choose a selected rig to suit a particular condition with a minimum delay. For certain fishing, the normal fishing rig includes a series of ganged hooks secured at the end of a swivelled trace, suitably a wire trace, and when several of this type of fishing rigs are carried in a fishing basket they are likely to tangle with one another.

The present invention has been devised to provide means whereby a plurality of such fishing rigs may be conveniently and safely carried for ready access by the angler. Other objects and advantages of the invention will become apparent from the following description.

With the foregoing and other objects in view, this invention resides broadly in a holder for supporting a plurality of fishing rigs of the type comprising a trace having a hook at one end thereof and a swivel at the other end thereof, said holder including a body portion having an engagement face formed of penetrable material into which the free ends of the hooks may be inserted and a plurality of locating means each adapted to hold a respective swivel remote from said engagement face and guide means for locating the traces intermediate said engagement face and said locating means.

In order that the invention may be more readily understood and put into practical effect, reference will now be made to the accompanying drawings which illustrate a preferred embodiment of the invention and wherein:

FIG. 2 is a plan view of the outer housing of the hook holder assembly;

FIG. 3 is a cross-sectional view along the lines 3—3 of FIG. 2;

FIG. 4 is an inverted plan view of the insert portion of the hook holder assembly; and FIG. 5 is a cross-sectional view along the line 5—5 of FIG. 4.

Figure 1:
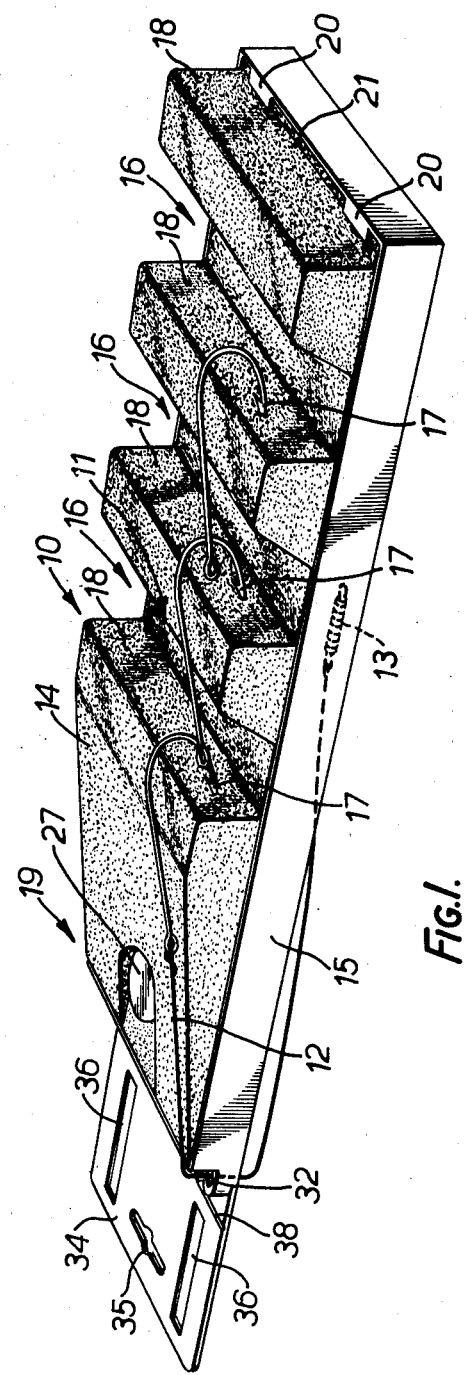
FIG. 1 is a perspective view of a hook holder assembly according to the present invention.

The hook holder 10 of the present invention has been designed for easy and tidy storage of a plurality of fishing rigs each of which may comprise, for example, a set of ganged hooks 11, the associated trace 12 and a connecting swivel 13. The hook holder is made as a two-piece assembly for manufacturing convenience, and comprises an insert portion 14 into which the hooks 11 may penetrate and an outer flexible housing 15 in which the insert portion 14 is supported. As shown, the insert 14 is provided with a series of transversely extending ridges 16 forming recesses in which the barbed ends 17 of the hooks 11 may be located in an upstanding attitude with their respective sharp ends pushed into penetrating engagement with the upstanding back engagement face 18 of the respective ridges 16. For this purpose, the insert 14 is made of polystyrene to enable the free end 17 of each hook to be easily inserted therein for retention in its stowed position. Of course, a series of such rigs may be located in the insert 14 in side by side relationship and arranged with the traces 12 extending about the opposite end 19 of the insert 14 for return passage therebeneath to co-operate with locating means remote from the engagement faces 18 as will be later described.

The insert 14 is supported within the housing 15 which may, for example, be made from polypropylene and the insert 14 is retained therein by locating members 20 at one end of the housing which engage behind a ledge 21 formed behind the rearmost engagement face 18, a plug-in clip assembly 22 adapted to secure the opposite end of the insert 14 into the housing 15, and a spigot portion 23 which is formed centrally in the underside of the insert 14 and which is adapted to be pushed into engagement with a corresponding socket 24 formed in the base 9 of the housing 15. The socket 24 is provided with a tapered inwardly extending flange 25 for nonretractable engagement with the spigot portion 23.

As shown in FIG. 3, the clip assembly 22 includes a socket 26 formed in the base 9 of the housing 15 and a button member 27 having a headed shaft 28 which is adapted to pass through the corresponding aperture 29 in the insert and be secured into the socket 26.

As illustrated in the drawings, the underside of the insert 14 is provided with a plurality of equally spaced transversely extending recesses 30 of suitable size to enable a swivel to be located therein and co-operating rows of elongate apertures 31 are provided in the base 9 of the housing 15 through which a swivel may be inserted for engagement in a respective recess 30, after being forced through a respective one of the correspondingly positioned apertures 31. For this purpose the width of each aperture 31 is such that the sides thereof have to be sprung apart to enable a swivel to pass therethrough.

Furthermore, it will be seen that the housing 15 is provided with a plurality of transverly spaced apertures 32 passing through the base 9 and these apertures 32 are in transverse alignment with the rows of elongate apertures 31 whereby the trace 12 of a rig may be positively held in the holder for non-tangle storage thereby passing the trace 12 through a respective aperture 32 prior to return beneath the base 9 of the assembly 10 where the swivel may be secured by forcing the swivel through a respective aperture 31 into one of the recesses 30. It will thus be seen that the holder 10 will accommodate rigs having various trace lengths as the swivel may be located at the end adjacent the apertures 32 at the opposite end or at any position intermediate therebetween.

Thus, in use, a plurality of fishing rigs may be conveniently stored on the holder according to the present invention, and in their stowed attitude, the hooks will be retained so that they cannot become entangled with the hooks of adjacent rigs, while the traces and swivels are secured with the swivels held between the co-operating faces of the recesses 30 and the base 9 of the housing 15.

It will be seen further that the flexible plastic housing will support and strengthen the polystyrene insert so as to prevent accidental breakage thereof when the latter is stored say in a fishing creel and in addition, the end of the housing adjacent the apertures 32 is provided with a hinged flap 34 which is provided with a central aperture 35 whereby the holder 10 may be supported on a wall hook, and a pair of slots 36 at opposite sides of the flap 34 to enable the holder 10 to be secured to a belt so that it may hang therefrom. The flap is hinged in conventional manner by a weakening depression 38 extending thereacross and this hinge arrangement is provided so that when the holder is located on a fisherman's belt, it can be easily lifted up to provide access to the rear of the holder so that the selected trace and swivel can be easily removed. Furthermore, the described embodiment is provided with nine apertures 32 therethrough so that nine fishing rigs can be conveniently stowed in the holder. However, this can be varied to suit the particular application and of course, it is envisaged that the holder would be provided in various proportions to suit different fishing rigs for large and small fish.

It will, of course, be realized that while the above has been given by way of illustrative example, many modifications of constructional detail and design may be made to the above described embodiment by persons skilled in the art without departing from the broad scope and ambit of the invention as is defined in the appended claims.

I claim:

1. A holder for supporting fishing rigs of the type comprising a trace having a hook at one end thereof and a swivel at the other end thereof, said holder including an open top flexible housing and an insert portion adapted to be supported in said housing, the base of said housing being provided with at least one elongated aperture and said insert portion having on its upper side an engagement face formed of penetrable material into which the free end of a said hook may be inserted and a recess on its underside arranged in operative alignment with said aperture or apertures, said recess and each said aperture comprising holding means co-operating to hold a respective said swivel remote from said engagement face, and guide means for locating said trace intermediate said engagement face and said holding means.

2. A holder according to claim 1, wherein there are provided a plurality of said engagement faces spaced along said insert portion whereby a plurality of in-line ganged hooks may be operatively supported with their respective free ends engaged with a respective said engagement face.

3. A holder according to claim 2, wherein said insert portion is substantially rectangular solid shaped and said engagement faces are corresponding side faces of a plurality of upstanding ridges extending transversely across said insert portion in spaced apart relationship and said guide means being disposed at the side of said insert portion opposite said ridges.

4. A holder according to claim 3, wherein the base of said housing is provided with a plurality of substantially identical rows of said elongated apertures and said insert portion is provided with a plurality of spaced said recesses each arranged in operative alignment with a respective said row of apertures.

5. A holder according to claim 4, wherein said guide means is constituted by a plurality of guide apertures formed in said housing adjacent said side of said insert portion, each adapted to accommodate a respective said trace.

6. A holder according to claim 5, wherein there are provided releasable fastening means for securing said insert portion into said housing.

7. A holder according to claim 6, wherein said insert portion is formed of polystyrene.

8. A holder according to claim 7, wherein said housing is provided with an outwardly extending apertured flexible supporting flange at one end thereof.

* * * * *